United States Patent [19]

Kashiwada et al.

[11] Patent Number: 5,716,667
[45] Date of Patent: Feb. 10, 1998

[54] METHOD OF TEMPORARILY PROTECTING FINISHED COATING FILM ON AUTOMOBILE BODY

[75] Inventors: Seiji Kashiwada; Shouji Takahashi; Hiroshi Inoue; Kenya Suzuki, all of Hiratsuka, Japan

[73] Assignee: Kansai Paint Co., Ltd., Amagasaki, Japan

[21] Appl. No.: 628,645

[22] PCT Filed: Apr. 6, 1995

[86] PCT No.: PCT/JP95/00672

§ 371 Date: Apr. 22, 1996

§ 102(e) Date: Apr. 22, 1996

[87] PCT Pub. No.: WO96/16747

PCT Pub. Date: Jun. 6, 1996

[30] Foreign Application Priority Data

Dec. 1, 1994 [JP] Japan ................. 6-329713

[51] Int. Cl.⁶ ................. C08K 5/34; B05D 3/02
[52] U.S. Cl. ................. 427/156; 427/388.4; 524/94; 524/99; 524/102; 524/227; 524/228; 524/229; 524/336
[58] Field of Search ............. 524/94, 228, 229, 524/227, 291, 99, 102, 336; 428/412, 463, 424.4, 447, 483; 427/156, 155, 333, 388.4; 252/589

[56] References Cited

U.S. PATENT DOCUMENTS

| | | | |
|---|---|---|---|
| 2,976,259 | 3/1961 | Hardy et al. | 524/337 |
| 3,808,273 | 4/1974 | Burdet et al. | 524/229 |
| 4,071,639 | 1/1978 | Palmer et al. | 427/156 |
| 4,472,547 | 9/1984 | Malherb | 524/98 |
| 4,742,093 | 5/1988 | Sadler et al. | 427/155 |
| 5,143,949 | 9/1992 | Grogan | 427/155 |
| 5,374,362 | 12/1994 | McFarland | 428/412 |
| 5,428,095 | 6/1995 | Swidler | 427/388.4 |
| 5,514,746 | 5/1996 | Schwarte et al. | 427/388.4 |

FOREIGN PATENT DOCUMENTS 58-160327  9/1983  Japan ................. 524/336

*Primary Examiner*—Veronica P. Hoke
*Attorney, Agent, or Firm*—Fisher, Christen & Sabol

[57] ABSTRACT

A releasable aqueous coating composition used for temporarily protecting a finished coating film coated on an automobile body. It contains (A) an aqueous acrylic resin obtained by copolymerizing a monomer mixture of a (meth) acrylic ester monomer as an essential component and other polymerizable unsaturated monomer, except for (meth) acrylonitrile, as an optional component, and having a glass transition temperature of 5° to 30° C. and a weight average molecular weight of 20,000 or more, (B) an ultraviolet light absorber, and (C) a water repellent material. A method of temporarily protecting the finished coating film on the automobile body by coating the releasable aqueous coating composition onto a surface of a finished cured coating film coated onto the automobile body.

9 Claims, No Drawings ns, humores or carcasses of insects, sunlight, wind and rain, particularly acid rain, and the like during storage in an outdoor stock yard, or during transportation by cars, railways, trailers, ships and the like in such a period of time as from completion to passing into the possesion of users of these coat-finished products, reduce commercial values of the coat-finished products. In order to prevent the above reduction in commercial values, the finished coating film is temporarily protected during such a period of time as from completion to passing into the possession of users of the coat-finished product. The following methods of temporarily protecting the coat-finished product are known in the art, all being unsatisfactory.

① An aliphatic hydrocarbon based solvent dispersion of waxes is coated. An emulsion prepared by dispersing a cleaning agent into a hydrocarbon solvent or water is used in removing a temporarily coated film. However, the application of the above emulsion to the automobile, for example, results in that anticorrosive agents and anticorrosive waxes coated onto interior parts of doors and hinge parts are simultaneously removed, too, and further that the use of the solvent may cause smelling of the finished coating film, and environmental problems such as danger of fire, waste water treatment and the like.

② Such a wax-solid powder organic solvent dispersion is coated that the wax is mixed with the solid powder so that strongth of a wax film may be reduced and a protecting film may easily be removable by hand-wiping.

The above method has such drawbacks that the protecting film shows poor properties in the temporarily protecting properties, may easily drop by contact with hands, and may easily be polluted by the acid rain.

③ It is known in the art to use an emulsion containing, as a major component, acrylic resin as an aqueous, temporarily protecting agent. Since the above emulsions contain carboxyl group-containing monomers such as acrylic acid, methacrylic acid and the like in a large amount, a resulting film is difficult to be removed and is removed by use of an aqueous alkaline solution, resulting in needing considerable manhours, and in causing problems of waste water disposal etc.

④ For example, Japanese Patent Application Laid-Open No. 259966/91 discloses the use of an acrylic resin emulsion containing (meth)acrylonitrile as an aqueous, temporarily protecting agent, and a resulting film shows excellent properties in film strength and release properties, but has difficulties in waste disposal of a released film because of containing (meth) acrylonitrile. For example, burying of the released film may cause water pollution, and incineration of the released film may generate hydrogen cyanide gas, resulting atmospheric pollution.

⑤ For example, U.S. Pat. No. 5,143,949 specification discloses the use of a coating composition containing, as a major component, a vinyl acetate emulsion as an aqueous protecting agent, but the resulting film shows poor properties in acid resistance, water resistance and the like.

As above described, in the case where the temporarily protecting agent is used, it is important to use a composition having the following properties.

(a) A resulting film shows a moderate adhesive properties to a finished coating film to be protected and is releasable as a continuous sheet by hands or high pressure water stream without damaging the finished coating film on releasing.

(b) The composition may be coated by spray coating, roller coating and brushing.

(c) A resulting film has excellent protecting functions, for example, prevention of stain and pollution due to acid rain, iron powder and the like, prevention of damages due to contact with other object and chipping, and the like.

(d) A resulting film has moderate properties in elasticity, strength, elongation and durability, and shows poor stickiness.

(e) A resulting film has properties necessary for outdoor storage in water resistance, weather resistance, and thermal stability.

(f) The composition does not contain additives such as solvent, plasticizer, dispersing agent and the like, which may cause swelling of the finished coating film, and defects on the surface of the finished coating film, for example, deformation, stain, hazy gloss and the like.

(g) Since a released film is discarded by burying or incineration, the released film contains none of any components harmful to human body and environment.

For the purpose of solving the above problems ① to ⑤ and of developing a method of temporarily protecting a finished coating film on an automobile body by use of a releasable aqueous coating composition having above properties (a) to (g), the present inventors made intensive studies and found out that coating a releasable aqueous coating composition containing a specified acrylic emulsion resin free of acrylonitrile and ultraviolet light absorber, if needed, under control of specified viscosity and surface tension onto the finished coating film on the automobile body makes it possible to form a releasable film, which is easily releasable without reducing film strength and elongation even if exposed to sunlight or the like for a long period of time, which has excellent properties in protective functions to acid rain and the like, and which is free of environmental problems on burying and incineration after releasing, resulting in making it possible to temporarily protect the finished coating film and in accomplishing the present invention.

DISCLOSURE OF THE INVENTION

That is, the present invention relates to a method of temporarily protecting a finished coating film on an automobile body, which method comprises coating a releasable aqueous coating composition containing (A) an aqueous acrylic resin obtained by copolymerizing a monomer mixture of a (meth)acrylic ester monomer as an essential component and other polymerizable unsaturated monomer, except for (meth)acrylonitrile, as an optional component, and having a glass transition temperature of 5° to 30° C. and a weight average molecular weight of 20,000 or more, and (B) an ultraviolet light absorber onto a surface of a finished cured coating film coated onto the automobile body.

PREFERRED EMBODIMENTS FOR THE PRACTICE OF THE INVENTION

The finished cured coating film, onto which the releasable aqueous coating composition is coated, in the present invention may include ones obtained by coating a known curing type coating composition onto the automobile body, followed by curing under desirable temperature and time conditions, and preferably may include a coating film having a glass transition temperature controlled in the range of 50° to 130° C. The curing type coating composition may include clear coating compositions, metallic coating compositions containing a metallic pigment such as alminum powder, mica-like powder, mica-like powder coated with titanium oxide or the like, and, if needed, a color pigment, solid color coating compositions containing a color pigment, and the like. Kinds of the curing type coating composition may include aqueous ones, organic solvent ones, powder ones and the like. A curing type resin composition constituting the curing type coating composition may preferably include ones consisting of a base resin such as acrylic resin, polyester resin, alkyd resin, fluorocarbon resin, silicone resin, epoxy resin or the like and a crosslinking agent such as amino resin, polyisocyanate compound, polycarboxylic acid compound, polyepoxy compound or the like, polymers containing a self-curing monomer such as N-butoxymethyl acrylamide as a monomer component, and the like, acrylic resin based, aminoalkyd resin based or urethane resin based coating film being particularly preferred. The curing type coating composition may optionally contain extender pigments, various additives and the like. The above cured coating film may include once prepared by coating the above curing type coating composition onto a substrate such as metal, plastic and inorganic material, directly or, if needed, through a primer, intercoat, basecoat or the like, followed by curing under such conditions that the glass transition temperature of the cured coating film may be within the above range.

When the glass transition temperature of the cured coating film is lower than 50° C., the releasable film may show poor releasability due to a long time outdoor exposure, or film defects such as release mark, stain, hazy gloss and the like may develop on the cured coating film after releasing. On the other hand, when the glass transition temperature of the cured coating film is higher than 130° C., the releasable film may spontaneously be released due to its poor adhesive properties during storage. The glass transition temperature of the cured coating film is one determined by applying a free cured coating film (wideth 5 mm, length 20 mm, thickness 30 µm) to DYNAMIC VISCOELASTOMETER MODEL VIBRON DDV-II EA, made by TOYO BACDWIN Co., Ltd. for measuring.

The aqueous acrylic resin (A) constituting the releasable aqueous coating composition used in the present invention is an acrylic resin obtained by copolymerizing a monomer mixture of a (meth)acrylic ester monomer as an essential component and other polymerizable unsaturated monomer, except for (meth) acrylonitrile, as an optional component, and having a weight average molecular weight of 20,000 or more, a content of a carboxyl group-containing unsaturated monomer preferably being 5% by weight or less, a glass transition temperature of the acrylic resin preferably being in the range of 5° to 30° C.

The (meth)acrylic ester may include esterified products between acrylic acid or methacrylic acid and monohydric alcohol having 1 to 28 carbon atoms, for example, methyl acrylate, methyl methacrylate, ethyl acrylate, ethyl methacrylate, n-butyl acrylate, n-butyl methacrylate, iso-butyl acrylate, iso-butyl methacrylate, tert-butyl acrylate, tert-butyl methacrylate, propyl acrylate, propyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate, cyclohexyl acrylate, cyclohexyl methacrylate, stearyl acrylate, stearyl methacrylate, and the like.

The (meth)acrylic ester may also include hydroxyl group-containing unsaturated monomers such as 2-hydroxyethyl acrylate, 2-hydroxyethyl methacrylate, 2-hydroxypropyl acrylate, 2-hydroxypropyl methacrylate and the like.

The other polymerizable unsaturated monomer may include, except for the above (meth)acrylic ester and (meth) acrylonitrile, for example, styrene, vinyl toluene, methyl styrene, chlorostyrene, divinyl benzene, vinyl acetate, vinyl chloride, vinyl isobutyl ether, methyl vinyl ether, 2-ethylhexyl vinyl ether, sulfonic acid group-containing monomer such as sulfoethyl methacrylate salt and the like, amide group-containing monomer such as acrylamide, methacrylamide and the like, and the like.

A mixing ratio between (meth)acrylic ester and other polymerizable unsaturated monomer is not particularly limited, but the (meth)acrylic ester is in the range of 1 to 100% by weight, preferably 50 to 99.8% by weight, more preferably 80 to 99.8% by weight, and the other polymerizable unsaturated monomer is in the range of 99 to 0% by weight, preferably 50 to 0.02% by weight, more preferably 20 to 0.02% by weight based on a total amount of both components respectively.

The component (A) may also contain carboxyl group-containing unsaturated monomer for copolymerization in an amount of 5% by weight or less, preferably 0.1 to 3% by weight. When the above amount is more than 5% by weight, adhesion to the coating film to be protected may be increased, resulting in making it difficult to release the releasable film. Examples of the carboxyl group-containing unsaturated monomer may include acrylic acid, methacrylic acid, itaconic acid, maleic acid, fumaric acid and the like.

The component (A) may be obtained by subjecting the above monomer in a predetermined amount to emulsion polymerization in the presence of at least one of emulsifiers such as nonionic surface active agent, anionic surface active agent, a reactive surface active agent having copolymerizable unsaturated group and the like, by use of a polymerization initiator according to the known process in the art. The component (A) may also be obtained according to the known suspension polymerization other than emulsion polymerization.

The resulting acrylic copolymer as the component (A) desirably has a glass transition temperature of 5° to 30° C., preferably 6° to 20° C. When the above temperature is lower than 5° C., adhesiveness of the releasable film may be increased and strength of the releasable film may be reduced, resulting in reducing releasability with time. When higher than 30° C., the releasable film may show poor film-forming properties, and crazing may develop on the releasable film when coated at an environmental temperature of 15° to 30° C., resulting in making it impossible to obtain a continuous film. The component (A) has a weight average molecular weight of 20,000 or more, particularly 30,000 to 100,000. When less than 20,000, the film strength is reduced, resulting in extremely reducing releasability.

In the case where the acrylic resin (A) only is used, an outdoor exposure of several months or more extremely reduces elongation of the releasable film due to photo-deterioration, resulting in that the releasable film may easily be torn to pieces on releasing, and that considerable manpowers may be needed on releasing. Therefore, it is an object of using the ultraviolet light absorber (B) to prevent the above photo-deterioration of the releasable film, and to provide good releasability after protection for a long period of time.

The ultraviolet light absorber (B) may include ones known in the art. Specific examples thereof may include salicylic acid derivatives such as phenyl salicylate, p-octylphenyl salicylate, 4-tert-butylphenyl salicylate and the like; benzophenone series such as 2,4a-dihydroxybenzophenone, 2-hydroxy-4-methoxybenzophenone, 2,2'-dihydroxy-4-methoxybenzophenone, 2-hydroxy-a-methoxy-2'-carboxybenzophenone, 2-hydroxy-4-methoxy-5-sulfobenzophenone trihydrate, 2,2'-dihydroxy-4,4'-dimethoxybenzophenone, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, 2,2'-dihydroxy-4(3-methacryloxy-2-hydroxypropoxy)-benzophenone and the like; benzotriazole series such as 2-(2'-hydroxy-5'-methylphenyl)benzotriazole and the like; other compounds such as oxalic anilide, cyanoacrylate and the like, and the like.

The ultraviolet light absorber (B) may preferably be used in combination with a light stabilizer from the standpoint of releasability with time. The light stabilizer may include ones known in the art, for example, hindered amine based light stabilizers and the like. Specific examples may preferably include bis (2,2',6,6'-tetramethyl-4-piperidinyl)-sebacate, 4-benzoyloxy-2,2',6,6'-tetramethylpiperidine and the like. Photooxidation of the acrylic resin (A) forms polar groups in a large amount, resulting in that the releasable film may strongly adhere to the finished coating film on the automobile body to be unreleasable. Addition of the light stabilizer controls photooxidation to obtain good releasability.

Amounts of the component (B) and light stabilizer may optionally be selected depending on objects, but may preferably be in the range of 0.1 to 10 parts by weight, particularly 0.3 to 5 parts by weight per 100 parts by weight of the component (A) respectively.

The releasable aqueous coating composition used in the present invention contains the above components (A) and (B) as the essential components, but may further contain a water repellent material (C) as an optional component.

Use of the water repellent material in combination with the components (A) and (B) makes it possible to maintain such functions that the releasable film formed from the above releasable aqueous coating composition has a moderate adhesion onto the surface of the finished coating film to be protected, and may completely be releasable without damaging the finished coating film on releasing, for a remarkably long period of time, i.e., three to five times longer period of time. The water repellent material may preferably include at least one compound selected from wax series, silicone series, fluorocarbon series and the like. These compounds may be in the state of being dissolved or dispersed in water, or powdered.

Specific examples of the wax may include vegetable series such as candelilla wax, carnauba wax, rice wax, Japan wax, jojoba oil and the like; animal series such as bees wax, lanolin, spermaceli and the like; mineral series such as montan wax, ozocerite, ceresine and the like; petroleum series such as paraffin wax, microcrystalline wax, petrolatum and the like; synthetic hydrocarbon series such as Fischer. Tropsch wax, polyethylene oxide wax, polyethylene wax, acrylic-ethylene copolymer wax and the like; modified wax series such as montan wax derivatives, paraffin wax derivatives, microcrystalline wax derivatives and the like; hydrogenated wax such as hardened castor oil, hardened castor oil derivatives and the like; other waxes such as 12-hydroxystearic acid, stearic amide anhydrous phthalic imide, bisamide, amide, glycerine ester, sorbicane ester, $C_{12}$ or more, preferably $C_{18}$ or more higher alcohols, $C_{12}$ or more, preferably $C_{18}$ or more higher fatty acids, and the like.

The above wax series desirably have a melting point of about 15° to 250° C., preferably about 20° to 180° C.

When the melting point is outside the above range, the releasable film may show poor properties in water resistance, acid resistance and the like.

The silicone series compounds may include ones having siloxane bond as backbone, for example, silicone oil, silicone powder, silicone emulsion, silicone water-soluble resin and the like. Specific examples thereof may include dimethyl polysiloxane series, methylphenyl polysiloxane series, cyclic dimethyl polysiloxane series, fluoropolysiloxane series, modified ones by amino, epoxy, polyether, alcohol, fluoro, mercapto, carboxyl, alkyl higher fatty acids respectively, for example, ones marketed by TORAY DOW CORNING SILICONE Co., Ltd. under the following trade names, silicone oil such as SH203, BY16-828, SF8411, SF8418, BY16-838, SF8422, BY16-848, SH3771, SH3746, SF8419 and FS1265; silicone powder such as R900, R901, R902, F100, F101, F200, F201, F202, F203, F400, F300, F301, F250, E500, E500, E600, E601, E602, E603 and E850; silicone emulsion such as SH204, SH490, SH7024, SH7028, SH7036 and SH7060; silicone aqueous resin such as SH3746, SH3749 and SH3771, and the like. The above silicone powder may have a mean particle size of usually about 0.1 to 100 μm, preferably about 5 to 50 μm.

Of these, the polyether-modified silicone oil having a molecular weight of 1000 to 20000 and represented by the following formula:

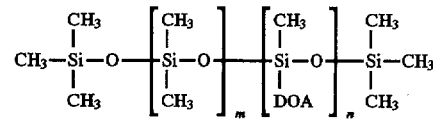

where m and n are a positive integer, DOA represents polyether moiety due to ethylene oxide or propylene oxide modification, is the most prefered in that the polyether-modified silicone oil is hardly soluble in water, may easily form a water dispersion by use of a small amount of surface active agent, and may sufficiently be oriented in a lower layer portion of the releasable film, resulting in showing excellent properties in such functions as to lighten an adhesion increase caused in an interface between the finished coating film and the releasable film.

The fluorocarbon compound may preferably include ones containing fluoroalkyl group in the molecule and having a molecular weight of about 1,000 to 20,000, and may specifically include perfluoroalkyl carboxylate, perfluoroalkyl phosphate, perfluoroalkyl trimethyl ammonium salt, pepfluoroalkyl pentanone, perfluoroalkyl ethylene oxide adduct and the like. Examples of trade names thereof (marketed by Asahi Glass Co., Ltd.) may include SURFLON S-111, S-112, S-113, S-121, S-131, S-132, S-142, S-145, 131S, 145S and the like.

Of these water repellent agents, the use of wax series and silicone compound has such advantages that a releasable film having excellent properties in water resistance and acid resistance may be obtained.

An amount of the water repellent agent (C) used may desirably be in the range of about 0.5 to 30 parts by weight, preferably about 1 to 20 parts by weight of the wax, about 0.01 to 10 parts by weight, preferably 0.1 to 5 parts by weight of the silicone compound, and about 0.01 to 5 parts by weight, preferably about 0.01 to 3 parts by weight of the fluorocarbon compound, per 100 parts by weight (as solid content) of the acrylic resin (A).

The releasable aqueous coating composition used in the present invention may be prepared by mixing the ultraviolet light absorber (B) and, if needed, the water repellent agent (C) as an aqueous emulsion with an aqueous dispersion of the acrylic copolymer (A), or by dispersing the ultraviolet light absorber (B) and the water repellent material (C) in a powdered state into the aqueous dispersion of the acrylic copolymer (A). Emulsification of the ultraviolet light absorber and water repellent agent may be carried out by a method of using a mechanical means, a method of using an emulsifier, or the like.

The releasable aqueous coating composition used in the present invention may also contain, if needed, an aqueous dispersion prepared by dispersing a known coating surface adjustor, anti-foaming agent, thickening agent, coloring agent, filler or the like by use of a surface active agent or water soluble resin, and the like. Particularly, incorporation of an aqueous dispersion of titanium white makes it possible to obtain a whitened releasable film, and the whitening results in making it possible to increase a barrier effect against ultraviolet light, heat and the like.

The releasable aqueous coating composition obtained, if needed, as above in the present invention is desirably coated onto the finished coating film on the automobile body under the control of a viscosity of 0.3 to 3.0 Pa·s, preferably 0.7 to 3.0 Pa·s and a surface tension of 40 mN/m or less, preferably 35 mN/m or less. Usually, a surface tension of the finished coating film surface may be in the range of 25 to 40 mN/m, and particularly in the case of the roller coating or the like, wetting properties of the coating composition to the finished coating film surface may be important, a surface tension of the protective coating composition may desirably be equal to or less than that of the finished coating film surface from the standpoint of obtaining excellent wetting properties.

When the above viscosity is less than 0.3 Pa·s, the coated composition may easily sag. On the other hand, when more than 3.0 Pa·s, the resulting releasable film surface may show poor smoothness and sharp unevenness, and, in the case of roller coating and brushing, troubles such as poor rotation may be caused, resulting in seriously reducing coating workability. Control of the above viscosity range may easily be carried out by adding a viscoelasticity selected from sodium polyacrylate, acrylic alkyl ester methacrylic acid copolymer, polyacrylic sulfonate, polyether series such as polyoxyalkylene alkyl phenyl ether, urethane-modified polyether series, ethylene-bis-aliphatic carboxylic acid amide, hydroxyethyl cellulose and the like to the above releasable aqueous coating composition in an amount of 0.01 to 0.3% by weight based on the above releasable aqueous coating composition.

When the above surface tension is more than 40 mN/m, particularly in the case of roller coating and brushing, good wetting properties to the finished coating film on the automobile body may not be obtained, and poor wetting properties such as cissing make it difficult to form a continuous releasable film. The above control of the surface tension may be carried out by adding a polyether-modified silicone oil such as dimethylpolysiloxane modified by ethylene oxide or propylene oxide as exemplified in the above component (C), a fluorocarbon based surface active agent such as perfluoroalkyl carboxylate, perfluoroalkyl phosphate, perfluoroalkyl amine oxide or the like, or the like to the releasable aqueous coating composition in an amount of 0.01 to 0.5% by weight based on the releasable aqueous coating composition.

A method of coating the above coating composition onto the finished coating film on the automobile body in the present invention may include conventionally used coating methods such as brushing, roller coating, spray coating and the like. Of these, the spray coating is the most effective, but coating of a limited area only on the automobile body may cause a problem of adhesion of spay mist. Masking of an area other than that coated with the protecting coating composition with masking tools or the like may be possible to prevent the above adhesion problem, but removing of masking tools may take a long period of time. Therefore, roller coating, particularly pressure feed type roller coating is preferred in the present invention.

Use of the pressure feed type roller coating machine makes it possible to coat a necessary area only at nearly 100% coating efficiency and to form a film thick enough to be manually releasable, resulting in providing a sufficient protecting function, too. A roller cover of the roller to be used may preferably be ones made of an woolen fiber having a fiber length of 7 mm or more, preferably 12 to 14 mm from the standpoint of obtaining a suitable film thickness. A fiber length less than 7 mm results in making it impossible to obtain a satisfactory film thickness, making protecting performance unsatisfactory, and reducing releasability with time. According to the pressure feed type roller, feeding of the releasable aqueous coating composition is carried out by use of a diaphragm pump, resulting in making possible a continuous feeding of the releasable aqueous coating composition. A size or length of the roller cover may be selected depending on a shape of an area to be coated on the automobile body.

The coated releasable film may be dried at room temperature for 1 or 2 hours, and when heated, for example, at 50° C. for 20 minutes, or at 70° C. for 10 minutes to such a dried state that even exposure to rain immediately after drying may not cause melting and falling down of the coated releasable film. Drying also may be carried out by irradiating medium infrared rays or far infrared rays for 30 seconds or one minute, followed by heating a surrounding temperature of 50° to 70° C. for 2 to 3 minutes to shorten a drying time. Film thickness of the releasable film may suitably be in the range of 5 to 100 μm as a dry thickness. In the above roller coating, a film thickness of the releasable film may preferably be in the range of 30 to 100 μm, preferably 50 to 80 μm.

Effect of the Invention

The method of temporarily protecting finished coating film on the automobile body comprises coating a liquid aqueous coating composition, resulting in being applicable to complicated shapes of the automobile contrary to a method of applying a protecting sheet in the art and the like, and in making it possible to greatly reduce manpowers for coating compared with manpowers for applying the protecting sheet in the art.

The releasable film formed according to the method of the present invention is stable against light, heat and the like, shows excellent releasability from the finished coating film on the automobile body with time and shows excellent protecting function against pollution due to suspended matters and droppings in air, resulting in making it possible to maintain the commercial values of the finished coating film on the automobile body for a long period of time, and in making it possible to easily release the releasable film by hands or high pressure water stream prior to passing into the possession of users of the coat-finished automobile. Incineration of the released film does not generate any harmful gas such as hydrogen cyanide gas or the like without raising any environmental problems.

Industrial Applicability

The method of temporarily protecting the finished coating film on the automobile body in the present invention is useful for preventing various reductions in commercial values concerning the finished, cured coating film on the coat-finished automobile body, which reductions may be caused during storage and transportation in a period of time of from completion of coating to passing into the possenssion of users of the coat-finished automobile.

EXAMPLE

The present invention will be explained more in detail by the following Examples and Comparative Examples, in which "part" and "%" mean by weight respectively.

(I) Preparation Examples of Acrylic Resin (A) Emulsion

[A-1]

A 2-liter four-necked flask equipped with a reflux condenser, stirrer, thermometer and dropping funnel was charged with 312 parts of deionized water and 2.3 parts of Newcol 707SF [Nippon Nyukazai Co., Ltd., trade name, anionic emulsifier (non-reactive), solid content: 30% by weight], followed by purging with nitrogen, and keeping at 80° C. Just prior to dropping a preemulsion having the following composition, 0.7 part of ammonium persulfate was added, followed by dropping the preemulsion over 3 hours.

<Composition of the Preemulsion>

| | |
|---|---|
| deionized water | 350 parts |
| methyl methacrylate | 440 parts |
| n-butyl acrylate | 352 parts |
| acrylic acid | 8 parts |
| Newcol 707SF | 53.3 parts |
| Ammonium persulfate | 1.5 parts |

Thirty mimutes after the completion of the reaction, a solution prepared by dissolving 0.7 part of ammonium persulfate into 7 parts of deionized water was added over 30 minutes, followed by keeping at 80° C. for 2 hours, lowering the temperature at 20 to 60° C., and controlling pH at 7 to 8 with ammonia water to obtain acrylic resin emulsion A-1. The resulting acrylic resin emulsion was such that the acrylic resin had a glass transition temperature (Tg) of 13.5° C. and a weight average molecular weight of about 30,000, and that the emulsion had a non-volatile matter of 51.7%, a viscosity of 0.68 Pa·s and a mean particle size of 0.2 μm.

Acrylic resin emulsions [A-2] to [A-6] were prepared according the formulations with different kinds of vinyl unsaturated monomers as shown in Table 1 in the same manner as in [A-1].

TABLE 1

| Acrylic resin emulsion | A-2 | A-3 | A-4 | A-5 | A-6 |
|---|---|---|---|---|---|
| Monomer Composition | | | | | |
| methyl methacrylate | 45 | 42 | 49 | 64 | — |
| n-butyl acrylate | 32 | — | 50 | 26 | 50 |
| ethyl acrylate | 21 | 57 | — | 9 | 16 |
| acrylonitrile | — | — | — | — | 33 |
| acrylic acid | 2 | 0.5 | 1 | 1 | 1 |
| acrylamide | — | 0.5 | — | — | — |
| Polymerization initiator | ammonium perfulfate | | | | |
| Glass transition temperature Tg (°C.) | 8.9 | 19.0 | 4.3 | 33.0 | −12.8 |
| Weight average molecular weight | 40,000 | 35,000 | 50,000 | 45,000 | 30,000 |
| *1 Particle size (μm) | 0.20 | 0.25 | 0.20 | 0.20 | 0.15 |
| *2 Non-volatile matter (%) | 49.7 | 50.5 | 51.3 | 50.2 | 50.7 |
| *3 Viscosity (20° C. Pa · s) | 0.43 | 0.52 | 0.148 | 0.26 | 0.78 |

*1 The particle size means a mean particle size measured by Nanosizer N-4 made by COULTER ELECTRONICS INC.

*2 The non-volatile matter means such that a sample was heated at 150° C. for 30 minutes, followed by measuring a residue and calculating therefrom.

*3 The viscosity means a value measured at a velocity of 60 rpm by use of a B-type viscometer.

(II) Ultraviolet light absorber (B) was selected from ones in a liquid state at normal temperature, or ones having a melting point of a reaction temperature on preparing the resin or lower.

(III) Preparation of water repellent material (C)

Such ones as impossible to be directly incorporated into the acrylic resin (A) emulsion may be incorporated thereinto after forming an aqueous dispersion by use of a surface active agent as follows.

[III-1] Preparation Example of Wax Emulsion

Respective glass vessels were charged with 20 parts of paraffin wax (MP 46° C.), montan wax and Hi-Mic-10810 (Trade name, marketed by Nippon Sairo Co., Ltd., microcrystalline wax) respectively, followed by adding one part of sorbitan monostearate, 3 parts of polyoxyethylene stearyl ether and 76 parts of water to the above respective vessels, heating at 80° to 90° C. with agitation to obtain respective wax emulsions having a solid content of 20%.

[III-2] Preparation Example of Silicone Oil Emulsion

To 30 parts of modified silicone oil TSF4445+(Marketed by Toshiba Silicone Co., Ltd., polyether-modified silicone oil) were added 2 parts of polyoxyethylene sorbitan monooleate and 68 parts of water, followed by thoroughly stirring to obtain a silicone oil emulsion having a solid content of 30%.

Examples 1–12 and Comparative Examaples 1–11

To respective 100 parts of the above acrylic resin emulsions [A-1]to [A-6] as solid contents were added the ultraviolet light absorbers and water repellent materials in the amounts as solid content as shown in Tables 2 and 3, followed by mixing with agitation to obtain releasable aqueous coating compositions respectively.

To the above compositions, when needed, were added polyoxyalkylene alkylphenyl ether, perfluoroalkylamine oxide, etc., so as to control viscosity and surface tension as shown in Tables 2 and 3, followed by spray coating the resulting compositions onto the coated panels, a cured coating film of which has a glass transition temperature of 82° C. and a surface tention of 36.5 mN/m, prepared by coating and curing the aminoalkyd resin coating composition (Marketed by Kansai Paint Co., Ltd., Trade name: AMILAC) at 140° C. for 30 minutes onto the 0.7 mm thick mild steel sheets surface-treated with PALBOND 3050 (Trade name, zinc phosphate based surface-treating agent, Marketed by Nihon Parkerrizing Co., Ltd.), followed by drying at 70° C. for 10 minutes to form a releasable coating film having a film thickness of 50 to 70 μm respectively. Performance test results of the releasable films are shown in Tables 2 and 3.

TABLE 2

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Formulation | | | | | | | | | | | | | |
| Acrylic resin emulsion | kind | A-1 | A-1 | A-1 | A-1 | A-1 | A-1 | A-1 | A-2 | A-2 | A-3 | A-3 | A-1 |
| | amount(part) | 100 | 100 | 100 | 100 | 100 | 100 | 100 | 100 | 100 | 100 | 100 | 100 |
| Ultraviolet light absorber(*1) and light stabilizer(*2) | kind | TINUVIN 1130 | TINUVIN 1130 | TINUVIN 1130 | TINUVIN 1130 | TINUVIN 1130 | TINUVIN 1130/LS-SANOL744 1/0.5 | SANDUVOR 3206 | TINUVIN 1130 | TINUVIN 1130 | TINUVIN 1130/LS-SANOL744 1/0.5 | TINUVIN 1130 | TINUVIN 1130/LS-SANOL292 1/0.5 |
| | amount(part) | 1 | 1 | 1 | 1 | 1 | 1 | 1 | 1 | 1 | 1 | 1 | 1 |
| Water repellent material(*2) | kind | — | paraffin wax | montan wax | micro-crystalline wax | TSF4445 | TSF4445 | TSF4445 | — | TSF4445 | SH204 | SURFLOW S-112 | TSF4445 |
| | amount(part) | — | 5 | 3 | 5 | 2 | 2 | 2 | — | 2 | 2 | 2 | 2 |
| Viscosity (Pa·s)(*3) | | 0.7 | 0.9 | 0.7 | 0.4 | 1.3 | 2.0 | 0.9 | 0.6 | 1.0 | 0.9 | 0.9 | 1.8 |
| Surface tension (mN/m)(*4) | | 34 | 30 | 31 | 30 | 26 | 28 | 29 | 35 | 27 | 27 | 26 | 28 |
| Film forming properties(*5) | | ○ | ○ | ○ | ○ | ○ | ○ | ○ | ○ | ○ | ○ | ○ | ○ |
| Roller coating workability(*6) | | ○ | ○ | ○ | ○ | ○ | ○ | ○ | ○ | ○ | ○ | ○ | ○ |
| Releasability | | | | | | | | | | | | | |
| Initial period(*7) | | ◎ | ◎ | ◎◎ | ◎ | ◎◎ | ◎◎◎ | ◎◎ | ◎ | ◎◎ | ◎ | ◎ | ◎◎◎ |
| Heat resistance(*8) | | ○ | ○ | ○ | ○ | ○ | ○ | ○ | ○ | ○ | ○ | ○ | ○ |
| Accelerated weather resistance(*9) | | ○ | ○ | ○ | ○ | ○ | ○ | ○ | ○ | ○ | ◎ | ○ | ○ |
| Accelerate weather resistance(*10) (Coated product appearance changes with time) | | ○ | ○ | ○ | ○ | ○ | ○ | ○ | ○ | ○ | ○ | ○ | ○ |
| Protecting Properties | | | | | | | | | | | | | |
| Acid resistance(*11) | | ○ | ○ | ○ | ○ | ○ | ○ | ○ | ○ | ○ | ○ | ○≠Δ light swelling | ○ |
| Iron-powder spreading properties(*12) | | ○ | ○ | ○ | ○ | ○ | ○ | ○ | ○ | ○ | ○ | ○ | ○ |
| Releasable film combustion test(*13) (Generation of hydrogen cyanide gas) | | none | none | none | none | none | none | none | none | none | none | none | none |

TABLE 3

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Formulation | | | | | | | | | | | | |
| Acrylic resin emulsion | kind | A-1 | A-1 | A-1 | A-1 | A-2 | A-2 | A-4 | A-4 | A-5 | A-6 | A-6 |
| | amount (part) | 100 | 100 | 100 | 100 | 100 | 100 | 100 | 100 | 100 | 100 | 100 |
| Ultraviolet light absorber(*1) and light stabilizer | kind | — | TINUVIN 1130 | TINUVIN 1130 | TINUVIN 1130 | — | TINUVIN 1130 | — | TINUVIN 1130 | TINUVIN 1130 | TINUVIN 1130 | TINUVIN 1130 |
| | amount (part) | — | 1 | 1 | 1 | — | 1 | — | 1 | 1 | 1 | 1 |
| Water repellent material(*2) | kind | — | — | — | TSF4445 | montan wax | TSF4445 | TSF4445 | TSF4445 | TSF4445 | — | TSF4445 |
| | amount (part) | — | — | — | 2 | 3 | 2 | 2 | 2 | 2 | — | 2 |
| Viscosity (Pa·s)(*3) | | 0.9 | 0.2 | 1.0 | 3.4 | 1.2 | 0.15 | 0.8 | 0.9 | 1.0 | 0.9 | 0.9 |
| Surface tension (mN/m)(*4) | | 30 | 30 | 42 | 28 | 27 | 28 | 28 | 27 | 29 | 31 | 28 |
| Film forming properties(*5) | | ○ | ○ | ○ | ○ | ○ | ○ | ○ | ○ | × | ○ | ○ |
| Roller coating workability(*6) | | ○ | × Sagging developed | × Poor metting | × bad roller rotating conditions | ○ | × Sagging developed | | | | | |
| Releasability | | | | | | | | | | | | |
| Initial period(*7) | | ◎ | ◎ | ◎ | ◎ | ◎ | ◎ | ◎ | ○ | ◎ | ◎ | ◎ |
| Heat resistance(*8) | | ○ | ○ | ○ | ◎ | ○ | ◎ | △ heavy | △ heavy | ◎ | ○ | ◎ |
| Accelerated weather resistance(*9) | | △ brittle | ○ | ○ | ○ | △ brittle | ○ | × un-measured | △ heavy | ○ | ○ | ○ |
| Accelerate weather resistance(*10) (Coated product appearance changes with time) | | ○ | ○ | ○ | ○ | ○ | ○ | un-measured | ○ | ○ | ○ | ○ |
| Protecting Properties | | | | | | | | | | | | |
| Acid resistance(*11) | | ○ | ○ | ○ | ○ | ○ | ○ | × | × | ○ | △ | △ |
| Iron-powder spreading properties(*12) | | ○ | ○ | ○ | ○ | ○ | ○ | ○ | ○ | ○ | ○ | ○ |
| Releasable film combustion test(*13) (Generation of hydrogen cyanide gas) | | none | none | none | none | none | none | none | none | none | gas generated (6 mg/g) | gas generated (5 mg/g) |

(*1) Ultraviolet Light Absorber and Light Stabilizer Ultraviolet Light Absorber

TINUVIN1130: Marketed by Ciba Geigy A. G., Trade name, Liquid, Benzotriazole derivative

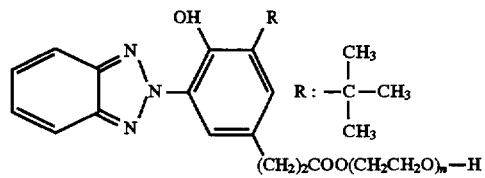

SANDUVOR 3206: Marketed by SANDZ, Trade name, Liquid, Ethane diamido-N-(2-ethoxyphenyl)-N'-(4-isododecylphenyl)

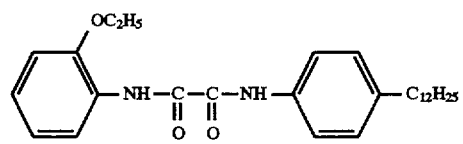

Light Stabilizer
SANOL LS-744: Marketed by Sankyo Co., Ltd., Trade name, Powder, 4-benzoyloxy-2,2',6,6'-tetramethylpiperidine
SANOL LS-292: Marketed by Sankyo Co., Ltd., Trade name, represented by the following formula

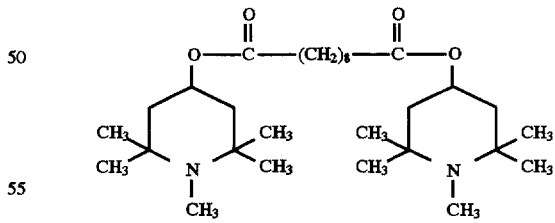

(*2) Water Repellent Material
SH204: Marketed by TORAY DOW CORNING SILICONE Co., Ltd., Trade name, Emulsion, Solid content: 35%.
SURFLON-112: Marketed by Asahi Glass Co., Ltd., Trade name, Perfluoroalkyl phosphate, water/isopropanol solution, solid content 15%.
(*3) Viscosity: Viscosity of a coating composition was measured by use of a B-type viscometer of Tokyo Keiki Co., Ltd. The measuring conditions were such that a coating solution temperature is 20° C. and a roter velocity is 60 rpm.

(*4) Surface Tension: A surface tension of a coating composition was measured by use of a Kyowa CBVP type tensiometer marketed by KYOWA CHEMICAL INDUSTRY Co., Ltd.

(*5) Film-Forming Properties:

Immediately after spray coating to be a dry film thickness of 60 to 70μm, a resulting coated test panel was left to stand under the conditions of an environmental temperature of 20° C. and a wind velocity of 0.5 to 0.7 m/S to investigate the coated surface.

○: Nothing abnormal. A continuous releasable coating film is formed.

Δ: Checking-like abnormality is observed in the range of 30% or less of the coated surface.

X: Checking-like abnormality is observed in the range of more than 30%.

(*6) Roller Coating Workability:

The coated panel was coated to be a dry film thickness of 60 to 70 μm by a pressure feed type roller coater and by use of a roller with a roller cover (WOO ROLLER B, Trade name, Marketed by Otsuka Brush Manufacturing Co., Ltd.) having a fiber thickness of 13 mm and a width of 180 mm and made of an woolen fiber to investigate wetting properties and sagging properties of the coating compositions and rotating conditions of the roller. (Wetting Properties)

○: Nothing abnormal. Cissing showing poor wetting properties is not observed.

Δ: Cissing showing poor wetting properties is observed in the range of 50% or less of the surface.

X: Poor wetting properties is shown all over the surface, resulting in making it impoossible to form a continuous film.

(Sagging Properties)

Immediately after roller coating, a test panel was kept at an angle of slope of 60 degree to observe sagging properties.

○: No sagging is observed.

Δ: Sagging develops in the range of half or less of the width of the coating.

X: Sagging develops all over the width of the coating.

(Rotating Conditions of Roller)

○: Nothing abnormal. The roller normally rotates to form a continuous releasable film.

Δ: Rotating conditions are not so good, and slipping partly takes place to form a thin film.

X: Rotating conditions are bad, and it is impossible to keep predetermined film thickness due to slipping.

(*7) Releasability (Initial period):

Formation of a releasable film was followed by leaving to stand at 20° C. for one day, and peeling off the releasable film coated on the test panel starting from its edge portion at a speed of 1 m/30sec. to examine releasability.

⊚: Very easily releasable.

○: Easily releasable.

□: Not so heavy.

Δ: Heavy but releasable.

Δ*: The releasable film is brittle and difficult to be released in the shape of a sheet.

X: Unreleasable.

(*8) Releasability (Heat Resistance):

The test panel was left to stand at 80° C. for 300 hours to examine releasability in the same manner as in (*7)

(*9) Releasability (Accelerated Weathering Resistance):

In accordance with QUV Accelerated Exposure Test by use of an accelerated weathering resistance testing machaine, marketed by Q PANEL Co., Ltd., testing was carried out under conditions of ultraviolet light irradiation of 16H/70° C. and water condensation of 8H/50° C. as one cycle for 480 hours (20 cycles), followed by examining releasability in the same manner as in (*7).

(*10) Accelerated Weathering Resistance (Appearance Changes of Finished Coating Film)

After peeling off the releasable film as in the above test (*9), the surface of the aminoalkyd coating film as the finished coating film was examined to see abnormalities such as swelling.

○: Nothing abnormal.

Δ: Light swelling is observed.

X: Serious swelling is observed.

(*11) Protecting Properties (Acid Resistance):

Onto the releasable film was spotted 0.4 ml of 20% sulfuric acid, followed by heating at 60° C. for 15 minutes, washing with water, and peeling off the releasable film to observe swelling, gloss deterioration and etching marks on the amino-alkyd coating film.

○: Nothing abnormal.

Δ: Swelling is observed.

X: Gloss deterioration and etching marks are observed.

(*12) Protecting Properties (Iron Powder Spreading Properties):

Iron powder was sprinkled all over the releasable film through a 200 mesh screen, followed by heating at 80° C. for one hour, subjecting to a salt spray test at 35° C. for 48 hours, and peeling off the releasable film to examine spreading of the iron powder to the aminoalkyd coating film.

○: Nothing abnormal.

Δ: Spreading of iron is observed in the range of 30% or less of the coating film surface.

X: Spreading of iron is observed in the range of more than 30% of the coating film surface.

(*13) Releasable Film Combustion Test:

Test was carried out in accordance with JIB K7217 as follows to examaine generation of hydrogen cyanide gas.

Method of generating gas:

Tubular electric oven silica tube process.

| | |
|---|---|
| Amount of sample | 0.1 g |
| Temperature | 650 ± 10°C |
| Air flow rate | 0.5 l/min. |

Method of collecting gas:

HCN—Absorption in solution-method of determining an amount of gas:

Pyridine—pyrazolone absorptiometric method

| | |
|---|---|
| Limit of detection | 0.005 mg/g |

What is claimed is:

1. A method of temporarily protecting a finished coating film on an automobile body, which method comprises coating a releasable aqueous coating composition containing (A) an aqueous acrylic resin obtained by copolymerizing a monomer mixture of an acrylic ester monomer or a methacrylic ester monomer as an essential component, a carboxyl group-containing unsaturated monomer and other polymerizable unsaturated monomer, except for acrylonitrile and methacrylonitrile as optional components, said carboxyl group-containing unsaturated monomer being contained in an amount of 5 percent by weight or less in the monomer mixture, and having a glass transition temperature of 5° to 30° C. and a weight average molecular weight of 20,000 or more, (B) 0.1 to 10 parts by weight of an ultraviolet light absorber per 100 parts by weight as solid content of acrylic resin (A), and (C) about 0.5 to 30 parts by weight of a water repellent material per 100 parts by weight, as solid content of acrylic resin (A), the water repellent material being at least one member selected from the group consisting of wax series of materials, having a melting point of about 15° to 250° C., silicone series compounds having siloxane as backbone and fluorocarbon series compounds onto a surface of a finished cured coating film coated onto the automobile body to form a releasable coating film, and removing the releasable coating film after use as a continuous sheet.

2. The method as claimed in claim 1, wherein the releasable aqueous coating composition contains a hindered amine light stabilizer.

3. The method as claimed in claim 1, wherein a viscosity of the releasable aqueous coating composition is controlled in the range of 0.3 to 3.0 Pa·s to be coated.

4. The method as claimed in claim 1, wherein a surface tension of the releasable aqueous coating composition is controlled in the range of 40 mN/m or less to be coated.

5. The method as claimed in claim 1, wherein the releasable aqueous coating composition is coated by a pressure feed type roller coating machine.

6. The method as claimed in claim 1, wherein a glass transition temperature of a finished, cured coating film coated onto an automobile body is in the range of 50° to 130° C.

7. The method as claimed in claim 1, wherein the finished coating film on the automobile body is an acrylic resin based, aminoalkyd resin based or urethane resin based film.

8. A releasable aqueous coating composition used for temporarily protecting a finished coating film coated on an automobile body, and containing (A) an aqueous acrylic resin obtained by copolymerizing a monomer mixture of an acrylic ester monomer or a methacrylic ester monomer, as an essential component, a carboxyl group-containing unsaturated monomer and other polymerizable unsaturated monomer, except for methacrylonitrile and acrylonitrile as optional components, said carboxyl group-containing unsaturated monomer being contained in an amount of 5 percent by weight or less in the monomer mixture, and having a glass transition temperature of 5° to 30° C. and a weight average molecular weight of 20,000 or more, (B) 0.1 to 10 parts by weight of an ultraviolet light absorber per 100 parts by weight as solid content of acrylic resin (A), and (C) about 0.5 to 30 parts by weight of a water repellent material per 100 parts by weight as solid content, of acrylic resin (A), the water repellent material being at least one member selected from the group consisting of materials wax series having a melting point of about 15° to 250° C., silicone series compounds having siloxane as backbone and fluorocarbon series compounds, a coating film formed by coating the releasable aqueous coating composition being releasable as a continuous sheet upon releasing.

9. A method as claimed in claim 1, wherein the water repellent material (C) is a polyether-modified silicon oil having a molecular weight of 1,000 to 20,000 and represented by the following formula:

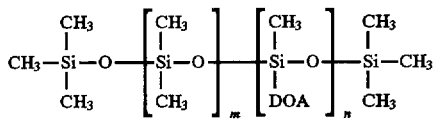

wherein m and n each is a positive integer, and DOA represents polyether moiety due to ethylene oxide or propylene oxide modification.

* * * * *